United States Patent
Ewart et al.

(10) Patent No.: US 9,045,628 B2
(45) Date of Patent: *Jun. 2, 2015

(54) PROCESSES TO PREPARE ETHYLENE-BASED POLYMER COMPOSITIONS

(75) Inventors: Sean W. Ewart, Pearland, TX (US); Sarat Munjal, Lake Jackson, TX (US); Alfred E. Vigil, Jr., Houston, TX (US); Teresa P. Karjala, Lake Jackson, TX (US); Mehmet Demirors, Pearland, TX (US)

(73) Assignee: Dow Global Technologies LLC, Midland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/990,061

(22) PCT Filed: Nov. 21, 2011

(86) PCT No.: PCT/US2011/061622
§ 371 (c)(1),
(2), (4) Date: May 29, 2013

(87) PCT Pub. No.: WO2012/074812
PCT Pub. Date: Jun. 7, 2012

(65) Prior Publication Data
US 2013/0253126 A1 Sep. 26, 2013

Related U.S. Application Data

(60) Provisional application No. 61/419,560, filed on Dec. 3, 2010.

(51) Int. Cl.
C08F 4/64 (2006.01)
C08F 4/52 (2006.01)
(Continued)

(52) U.S. Cl.
CPC . *C08L 23/06* (2013.01); *C08F 4/34* (2013.01); *C08F 4/62193* (2013.01); *C08F 4/60193* (2013.01); *C08L 2314/06* (2013.01); *Y10S 526/903* (2013.01)

(58) Field of Classification Search
CPC .... C08F 4/60193; C08F 4/62193; C08F 4/34; C08F 2/38; C08F 6/02
USPC ........... 526/65, 74, 77, 82, 142, 161, 172, 67, 526/68, 136, 138, 135, 903, 84
See application file for complete search history.

(56) References Cited

U.S. PATENT DOCUMENTS 4,551,509 A * 11/1985 Takayuki et al. ............... 526/68
5,084,534 A    1/1992 Welborn, Jr. et al.
(Continued)

FOREIGN PATENT DOCUMENTS

GB   1 205 635    *  9/1970  ............ C08F 3/04
WO   WO 95/07941 A1 * 3/1995  ............ C08F 10/00
(Continued)

OTHER PUBLICATIONS

Gotz, Macromolecular Materials and Engineering, 2002, vol. 287, p. 16-22.
(Continued)

*Primary Examiner* — Rip A Lee

(57) ABSTRACT

The invention provides a process to form an ethylene-based polymer composition, the process comprising at least the following: Step 1: polymerizing a first ethylene-based polymer in the presence of at least one molecular catalyst and a hydrocarbon chain transfer agent, and at a polymerization pressure of at least 14,000 psi; Step 2: polymerizing a second ethylene-based polymer.

15 Claims, 8 Drawing Sheets

(51) Int. Cl.
C08F 4/76 (2006.01)
C08F 4/34 (2006.01)
C08L 23/06 (2006.01)
C08F 4/62 (2006.01)
C08F 4/60 (2006.01)

(56) References Cited

U.S. PATENT DOCUMENTS

| | | | |
|---|---|---|---|
| 5,272,236 A | 12/1993 | Lai et al. | |
| 5,278,272 A | 1/1994 | Lai et al. | |
| 5,432,242 A * | 7/1995 | Baron | 526/68 |
| 5,753,578 A | 5/1998 | Santi et al. | |
| 5,844,045 A | 12/1998 | Kolthammer et al. | |
| 5,869,575 A | 2/1999 | Kolthammer et al. | |
| 6,291,609 B1 * | 9/2001 | Crowther et al. | 526/127 |
| 6,448,341 B1 | 9/2002 | Kolthammer et al. | |
| 6,538,070 B1 | 3/2003 | Cardwell et al. | |
| 6,545,088 B1 | 4/2003 | Kolthammer et al. | |
| 6,566,446 B1 | 5/2003 | Parikh et al. | |
| 7,741,415 B2 * | 6/2010 | Conrad et al. | 526/65 |
| 8,202,958 B2 * | 6/2012 | Demirors et al. | 526/348 |
| 8,440,772 B2 * | 5/2013 | Yang et al. | 526/209 |
| 2005/0164872 A1 | 7/2005 | Boussie et al. | |
| 2010/0311927 A1 * | 12/2010 | Karjala et al. | 526/126 |
| 2011/0130533 A1 * | 6/2011 | Karjala et al. | 526/170 |
| 2012/0165481 A1 | 6/2012 | Demirors et al. | |
| 2012/0172545 A1 | 7/2012 | Demirors et al. | |
| 2012/0232244 A1 | 9/2012 | Demirors et al. | |

FOREIGN PATENT DOCUMENTS

| | | | |
|---|---|---|---|
| WO | WO 2006/049783 A1 * | 5/2006 | C08F 10/00 |
| WO | 2007075299 A2 | 7/2007 | |
| WO | 2007136494 A2 | 11/2007 | |
| WO | WO 2007/136494 A2 * | 11/2007 | C08F 2/04 |
| WO | 2009/114661 A1 | 9/2009 | |
| WO | 2010141557 A1 | 12/2010 | |
| WO | 2011032172 A1 | 3/2011 | |

OTHER PUBLICATIONS

Luft, Angew. Makromol. Chem, 1993, vol. 212, p. 157-166.
Rau, A. Chem. Eng. Technol. 2002, vol. 25, p. 494-498.
PCT/US2011/061622, International Search Report and Written Opinion.
PCT/US2011/061622, International Preliminary Report on Patentability.

* cited by examiner

US 9,045,628 B2

PROCESSES TO PREPARE ETHYLENE-BASED POLYMER COMPOSITIONS

REFERENCE TO RELATED APPLICATIONS

The present application is a 371 application of International Application No. PCT/US 11/61622, filed on Nov. 21, 2011, which claims the benefit of U.S. Provisional Application No. 61/419,560, filed Dec. 3, 2010.

BACKGROUND OF THE INVENTION

This invention relates to new ethylene-based polymer compositions formed by high pressure processes in the presence of a molecular catalyst and a free radical initiator. In conventional polymerizations of ethylene-based polymers, catalysts, such as metallocene catalysts, post-metallocene catalysts and Ziegler-Natta catalysts, when used in a high pressure reactor, result in excessive reactor fouling. In addition, such catalysts, under high pressures, are highly susceptibility to decompositions, and form high molecular weight polymers and gels. These catalysts are also deactivated by polar impurities in the reactor. In a commercial production plant with an ethylene recycle system, polar impurities can be produced from either the breakdown products from the free radical initiator or from agents used for catalyst deactivation. Thus, there is a need for polymerization processes to form new ethylene-based polymer compositions, and which do not result in reactor fouling. There is a further need for such processes that form lower amounts of decomposition products and lower amounts of high molecular weight polymer and gels.

GB 1205635 discloses the continuous polymerization of ethylene in two or more zones, comprises passing ethylene through a first polymerization zone, at a pressure of not less than 1600 atmospheres and a temperature of not less than 125° C., in the presence of a Ziegler type initiator; and passing the mixture of polymer and unreacted monomer to a second zone, at a pressure of at least 1600 atmospheres, and a temperature higher than the lowest temperature in the first zone, and in the presence of a free-radical initiator.

International Publication No. WO 2010/141557 discloses a process for polymerizing ethylene, in the presence of a catalyst, to form a crystalline ethylene-based polymer, having a crystallinity of at least 50%, in a first reactor or a first part of a multi-part reactor. The crystalline ethylene-based polymer is reacted with additional ethylene, in the presence of a free-radical initiator, to form an ethylenic polymer, in at least one other reactor or a later part of a multi-part reactor.

International Publication No. WO 2009/114661 discloses an ethylenic polymer comprising amyl groups (about 0.1 to about 2.0 units per 1000 carbon atoms), and a peak melting temperature, Tm, in ° C., and a heat of fusion, Hf, in J/g. The numerical values of Tm and Hf correspond to the relationship Tm >(0.2143*Hf)+79.643.

Additional polymerizations and/or polymers are disclosed in the following references: U.S. Pat. Nos. 5,084,534, 5,753, 578; International Publication Nos. WO 2007/136494, WO 2011/032172; Rau et al., *Kinetic Investigations of the Metallocene-Catalyzed Polymerization of Ethylene at High Pressure*, Chem. Eng. Technol. 25, 2002, 5, 494-498; Götz et al., *Influence of Aluminum Alkyl Compounds on the High-Pressure Polymerization of Ethylene with Ternary Metallocene-Based Catalysts. Investigation of Chain Transfer to Aluminum*, Macromolecular Materials and Engineering, 2002, 287, 16-22; Luft et al., and *High Pressure Polymerization of Ethylene with a Homogeneous Metallocene Catalyst*, Die Angewandte Makromolekulare Chemie, 212, 1993, 157-166.

As discussed above, there remains a need for polymerization processes to form new ethylene-based polymer compositions, and which do not result in reactor fouling. There is also a need for such processes that do not result in injector plugging. There is a further need for such processes that form lower amounts of decomposition products and lower amounts of high molecular weight polymer and gels; and there is a need to form polymers with excellent processability. These needs have been met by the following invention.

SUMMARY OF THE INVENTION

The invention provides a process to form an ethylene-based polymer composition, the process comprising at least the following:

Step 1: polymerizing a first ethylene-based polymer in the presence of at least one molecular catalyst and a hydrocarbon chain transfer agent, and at a polymerization pressure of at least 14,000 psi;

Step 2: polymerizing a second ethylene-based polymer.

BRIEF DESCRIPTION OF THE DRAWINGS

In FIGS. 1 and 2, there can be more than one catalyst injection points in each step, and more than one peroxide injection points in each step.

DETAILED DESCRIPTION OF THE INVENTION

Figure 1:
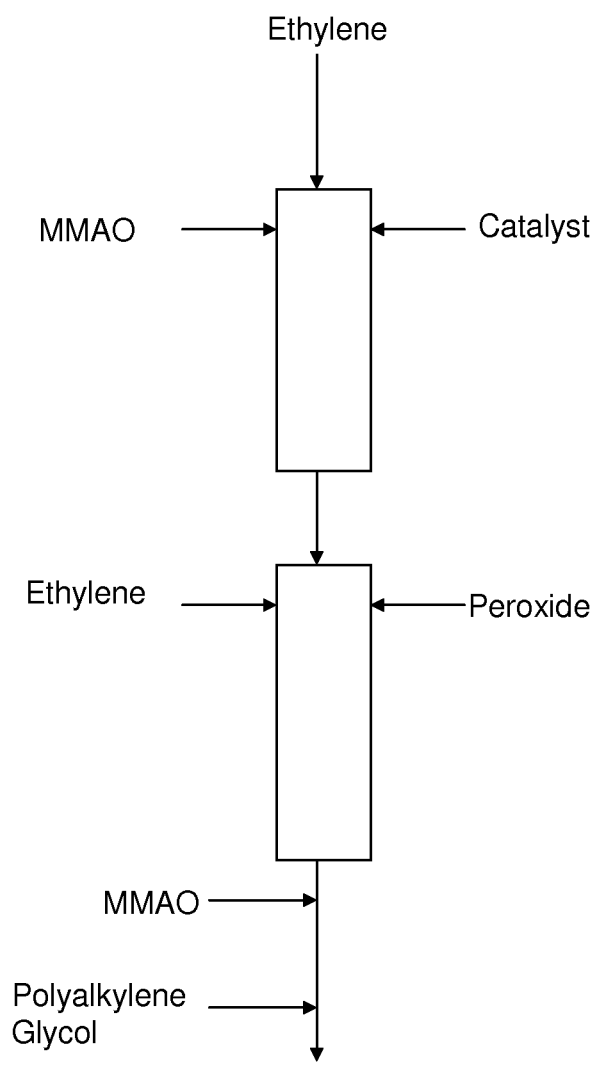
FIGS. 1-4 each represent a schematic of an example reactor configuration of an inventive process.

As discussed above, the invention provides a process to form an ethylene-based polymer composition, the process comprising at least the following:

Step 1: polymerizing a first ethylene-based polymer in the presence of at least one molecular catalyst and a hydrocarbon chain transfer agent, and at a polymerization pressure of at least 14,000 psi;

Step 2: polymerizing a second ethylene-based polymer.

An inventive process may comprise a combination of two or more embodiments as described herein.

In one embodiment, the second ethylene-based polymer is polymerized in the presence of a free radical initiator.

In one embodiment, the first ethylene-based polymer and the second ethylene-based polymer are polymerized simultaneously.

In one embodiment, the first ethylene-based polymer is polymerized first, and wherein the second ethylene-based polymer is polymerized in the presence of the first ethylene-based polymer.

In one embodiment, the polymerization pressure in Step 1 is at least 18,000 psi.

In one embodiment, the polymerization pressure in Step 1 is at least 22,000 psi.

In one embodiment, the polymerization pressure in Step 1 is at least 26,000 psi.

In one embodiment, the polymerization pressure in Step 1 is from 20,000 psi to 45,000 psi.

In one embodiment, the polymerization pressure in Step 1 is from 25,000 psi to 35,000 psi.

In one embodiment, the polymerization pressure in Step 1 and Step 2 is from 15,000 to 60,000 psi, preferably from 20,000 to 40,000 psi.

In one embodiment, the molecular catalyst is a zirconium complex of a polyvalent aryloxyether corresponding to the formula:

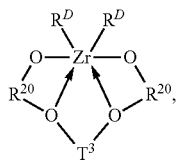

where $R^{20}$ independently in each occurrence is a divalent aromatic or inertly substituted aromatic group, each having from 5 to 20 atoms not counting hydrogen;

$T^3$ is a divalent hydrocarbon or a silane group, each having from 1 to 20 atoms not counting hydrogen, or an inertly substituted derivative thereof; and $R^D$ independently in each occurrence is a monovalent ligand group having from 1 to 20 atoms, not counting hydrogen, or two $R^D$ groups together are a divalent ligand group having from 1 to 40 atoms, not counting hydrogen.

In one embodiment, the molecular catalyst is soluble in supercritical ethylene.

In one embodiment, the molecular catalyst is active at polymerization temperature greater than, or equal to, 200° C.

In one embodiment, the molecular catalyst is active at polymerization temperature greater than, or equal to, 210° C.

In one embodiment, the molecular catalyst is active at polymerization temperature greater than, or equal to, 220° C.

In one embodiment, the molecular catalyst is selected from the group consisting of constrained geometry catalysts and post metallocene catalysts (e.g., polyvalent aryloxyether compounds).

In one embodiment, the molecular catalyst is selected from the group consisting of post metallocene catalysts (e.g., polyvalent aryloxyether compounds). Some examples of post metallocene catalysts are described in U.S. Publication No. 2005/0164872 and International Publication No. WO 2007/136494; each incorporated herein by reference.

In one embodiment, the molecular catalyst is selected from the group consisting of constrained geometry catalysts. Some examples of constrained geometry catalysts are described in U.S. Pat. Nos. 5,272,236 and 5,278,272; each incorporated herein by reference.

In one embodiment, the catalyst that has a very high chain transfer rate to ethylene.

In one embodiment, catalyst concentration in Step 1 is from 0.001 to 2 mol ppm, preferably from 0.001 to 0.1 mol ppm, based on the total amount of ethylene added to the polymerization process.

The molecular catalyst may comprise a combination of two or more embodiments as described herein.

In one embodiment, the first ethylene-based polymer is polymerized in the presence of an alumoxane cocatalyst. In a further embodiment, the alumoxane cocatalyst is present in an amount less than 50 mole ppm, preferably less than 40 mole ppm, and more preferably less than 30 mole ppm, based on the total amount of ethylene added to the polymerization process.

In one embodiment, the hydrocarbon chain transfer agent of Step 1 comprises from three to five carbon atoms.

In one embodiment, the hydrocarbon chain transfer agent of Step 1 is a non-aromatic compound.

In one embodiment, the hydrocarbon chain transfer agent of Step 1 is selected from the groups consisting of C3-C5 aliphatic alkanes, C3-C5 aliphatic alkenes, and C3-C5 aliphatic alkynes.

In one embodiment, the hydrocarbon chain transfer agent of Step 1 is added to the reactor in an amount from greater than, or equal to, 0.2 mole percent, based on the amount of ethylene added to this reactor.

In one embodiment, the hydrocarbon chain transfer agent of Step 1 is added to the reactor in an amount from greater than, or equal to, 0.5 mole percent, based on the amount of ethylene added to this reactor.

In one embodiment, the hydrocarbon chain transfer agent of Step 1 is added to the reactor in an amount from greater than, or equal to, 1 mole percent, based on the amount of ethylene added to this reactor.

In one embodiment, the hydrocarbon chain transfer agent of Step 1 is added to the reactor in an amount from less than, or equal to, 4 mole percent, based on the amount of ethylene added to this reactor.

In one embodiment, the hydrocarbon chain transfer agent of Step 1 is added to the reactor in an amount from less than, or equal to, 3.5 mole percent, based on the amount of ethylene added to this reactor.

In one embodiment, the hydrocarbon chain transfer agent of Step 1 is added to the reactor in an amount from less than, or equal to, 3 mole percent, based on the amount of ethylene added to this reactor.

In one embodiment, the hydrocarbon chain transfer agent of Step 1 is added to the reactor in an amount from 1 to 3.5 mole percent, based on the amount of ethylene added to this reactor.

In one embodiment, the hydrocarbon chain transfer agent of Step 1 is added to the reactor in an amount from 2 to 3 mole percent, based on the amount of ethylene added to this reactor.

In one embodiment, hydrocarbon chain transfer is present in Step 1 from 0.5 to 10 mol %, preferably from 0.5 to 3 mol %, based on the amount of ethylene added to this reactor.

The hydrocarbon chain transfer agent may comprise a combination of two or more embodiments as described herein.

In one embodiment, the free radical initiator is a peroxide. Some examples of peroxides include, but are not limited to, cyclic peroxides, diacyl peroxides, dialkyl peroxides, hydroperoxides, peroxycarbonates, peroxydicarbonates, peroxyesters, and peroxyketals.

In one embodiment, the free radical initiator is a peroxide that produces minimum amount of, and preferably no, polar cage products, and preferably does not produce carbon dioxide as a cage product. Polar cage products are described in M. Buback et al., *Initiator Efficiency of tert-Alkyl Peroxyesters in High-Pressure Ethene Polymerization*, Macromol. Chem. Phys., 2007, 208, 772-783, incorporated herein by reference. Examples of such peroxides include 2,5-dimethyl-2,5-di (tert-butylperoxy)hexane; 1.1-di(tertbutylperoxy)-3,3,5-trimethylcyclohexane; and di-tertbutylperoxide.

In one embodiment, the polymerization temperature in Step 1 is greater than, or equal to, 195° C.

In one embodiment, the polymerization temperature in Step 1 is greater than, or equal to, 200° C.

In one embodiment, the polymerization temperature in Step 1 is greater than, or equal to, 210° C.

In one embodiment, the polymerization temperature in Step 1 is greater than, or equal to, 220° C.

In one embodiment, the polymerization temperature in Step 1 is from 195° C. to 260° C.

In one embodiment, the polymerization temperature in Step 1 is from 200° C. to 240° C.

In one embodiment, the polymerization temperature in Step 1 is from 210° C. to 230° C.

In one embodiment, the polymerization temperature in Step 2 is from 180° C. to 310° C.

In one embodiment, the polymerization temperature in Step 2 is from 200° C. to 280° C.

In one embodiment, no hydrogen is added to Step 1.

In one embodiment, no hydrogen is added to Step 2.

In one embodiment, no hydrogen is added to Step 1 or Step 2.

In one embodiment, the process does not comprise a boron-containing compound.

In one embodiment, the process further comprises polymerizing a third ethylene-based polymer.

In one embodiment, at least one alkyl aluminum is added to the process after Step 2.

An alkylaluminum is a compound with at least one aluminum attached to one or more alkyl groups, such as triethylaluminum or triisobutylaluminum. These also include aluminoxane type species such as MAO or MMAO-3A (CAS#-146905-79-5).

In one embodiment, at least one polyalkylene glycol is added to the process after Step 2. In a further embodiment, the polyalkylene glycol has a number average molecular weight of at least 200 g/mole, or at least 250 g/mole, or at least 300 g/mole.

In one embodiment, the polyalkylene glycol is a compound of formula HO(CH2CHRO)nH, where R is an alkyl group or hydrogen. Preferably R=H (polyethylene glycol). Preferably n is from 3 to 10 repeat units.

In one embodiment, polar impurities are removed in the ethylene recycle stream by excess alkylaluminum or by molecular sieve beds in the ethylene recycle stream.

In one embodiment, a non-volatile catalyst kill is used to deactivate catalyst before it exits the final reactor in the polymerization process.

In one embodiment, the polymerization process is a continuous process.

In one embodiment, the first ethylene-based polymer is a polyethylene homopolymer.

In one embodiment, the second ethylene-based polymer is a polyethylene homopolymer.

In one embodiment, the first ethylene-based polymer is a polyethylene homopolymer, and the second ethylene-based polymer is a polyethylene homopolymer.

In one embodiment, the ethylene-based polymer composition has a percent crystallinity of at least 45 percent, as determined by DSC.

In one embodiment, the ethylene-based polymer composition has a percent crystallinity of at least 50 percent, as determined by DSC.

In one embodiment, the ethylene-based polymer composition has at least one melting point greater than 115° C., as determined by DSC.

In one embodiment, the ethylene-based polymer composition has at least one melting point greater than 120° C., as determined by DSC.

In one embodiment, the inventive process takes place in at least one autoclave reactor.

In one embodiment, the inventive process takes place in at least one tubular reactor.

In one embodiment, the inventive process takes place in at least one autoclave reactor and in at least one tubular reactor. In a further embodiment, the at least one autoclave reactor and the at least one tubular reactor are connected in series.

An inventive process may comprise a combination of two or more embodiments as described herein.

The invention also provides a polymer composition formed by an inventive process.

In one embodiment, the polymer composition has a fraction in CEF, at a temperature of at least 85° C., of at least 5 weight percent (based on weight of polymer composition), and which has a trefBr value greater than 0.5.

In one embodiment, the ethylene-based polymer composition has at least one melting point greater than 115° C., as determined by DSC.

In one embodiment, the ethylene-based polymer composition has at least one melting point greater than 120° C., as determined by DSC.

In one embodiment, the ethylene-based polymer composition has a density greater than, or equal to, 0.90 g/cc, preferably greater than, or equal to, 0.91 g/cc, more preferably greater than, or equal to, 0.92 g/cc (1 cc=1 cm$^3$).

In one embodiment, the ethylene-based polymer composition has a density less than, or equal to, 0.96 g/cc, preferably less than, or equal to, 0.95 g/cc, more preferably less than, or equal to, 0.94 g/cc (1 cc=1 cm$^3$).

In one embodiment, the ethylene-based polymer composition has a density less than, or equal to, 0.940 g/cc, or less than, or equal to, 0.935 g/cc (1 cc=1 cm$^3$).

In one embodiment, the ethylene-based polymer composition has a melt index (I2) greater than, or equal to, 0.05 dg/min, preferably greater than, or equal to, 0.10 dg/min, more preferably greater than, or equal to, 0.5 dg/min In one embodiment, the ethylene-based polymer composition has a melt index (I2) less than, or equal to, 100 dg/min, preferably less than, or equal to, 50 dg/min, more preferably less than, or equal to, 20 dg/min.

An inventive polymer composition may comprise a combination of two or more embodiments as described herein.

The invention also provides a composition comprising an inventive polymer composition and at least one additive.

An inventive composition may comprise a combination of two or more embodiments as described herein.

The invention also provides an article comprising at least one component formed from an inventive polymer composition or an inventive composition.

Polymerization

It has been discovered that by using a catalyst that has a very high chain transfer rate to ethylene, the effect of ethylene concentration on polymer molecular weight can be eliminated. It has also been discovered that these catalysts allow for increased the pressure and increased ethylene concentration, which, in turn, increase both the rate of propagation and the rate of chain transfer, keeping the polymer molecular weight nearly constant with increasing pressure.

Hydrogen in a high pressure reactor has been shown to cause increased background conversion, increased decomposition, increased hydrogenated byproducts, and increased metal embrittlement. It has been discovered that by using a catalyst that chain transfers to ethylene, and that has a strong temperature response to the rate of chain transfer, reactor temperature can be used as a molecular weight control, and hydrogen can be eliminated from the reactor.

Borate activators, such as trityl borate, have been shown to break down to form free radicals, and cause decompositions at elevated temperatures and ethylene pressures. It has been discovered that by choosing a catalyst that can be activated with only an alumoxane cocatalyst, these decomposition sensitive cocatalysts can be eliminated from the system.

Fouling in high pressure reactors can occur due to high molecular weight background LDPE, initiated either thermally or by adventitious oxygen in the system. It has been discovered that a hydrocarbon chain transfer agent can be used to in order to reduce the molecular weight and decrease the fouling tendencies of this background LDPE. CTA's which do not incorporate into the backbone may be preferred in some cases, as the density of the high density remains high. Incorporating CTA's such as propylene, butene, hexene, and octene may be preferred in other applications, in order to lower the density of the base linear polyethylene, and impart different physical property characteristics to the polyethylene, due to the lower density, as well as the length of the side chain resulting from the CTA/comonomer.

In a commercial process, typically all polar compounds produced in the reactor will recycle around and deactivate a molecular catalyst. These polar compounds can include decomposition products of the peroxides used to make the LDPE portion of the polymer composition or polar catalyst kill added after the first reactor to prevent further polymerization. For the inventive processes described herein, it has been discovered that these impurities can be scavenged by adding excess alkylaluminum to the reactor, or they can be avoided by using a carbon based free radical initiator or a non-volatile catalyst kill, such as poylethylene glycol, BHT or glycerol. Optionally molecular sieve beds can be added to the recycle ethylene line to remove any polar impurities before they recycle back to the reactor.

In one embodiment, in a two reactor process, the catalyst kill is added after the second reactor, and the alkylaluminum scavenger is added either into the first reactor, or into the incoming ethylene stream prior to the first reactor. In this manner, impurity scavenging will occur in the second reactor, and the recycle ethylene stream should remain clean.

In one embodiment, in a two reactor process, the alkylaluminum scavenger is added after the second reactor, but before the catalyst kill.

Figure 2:
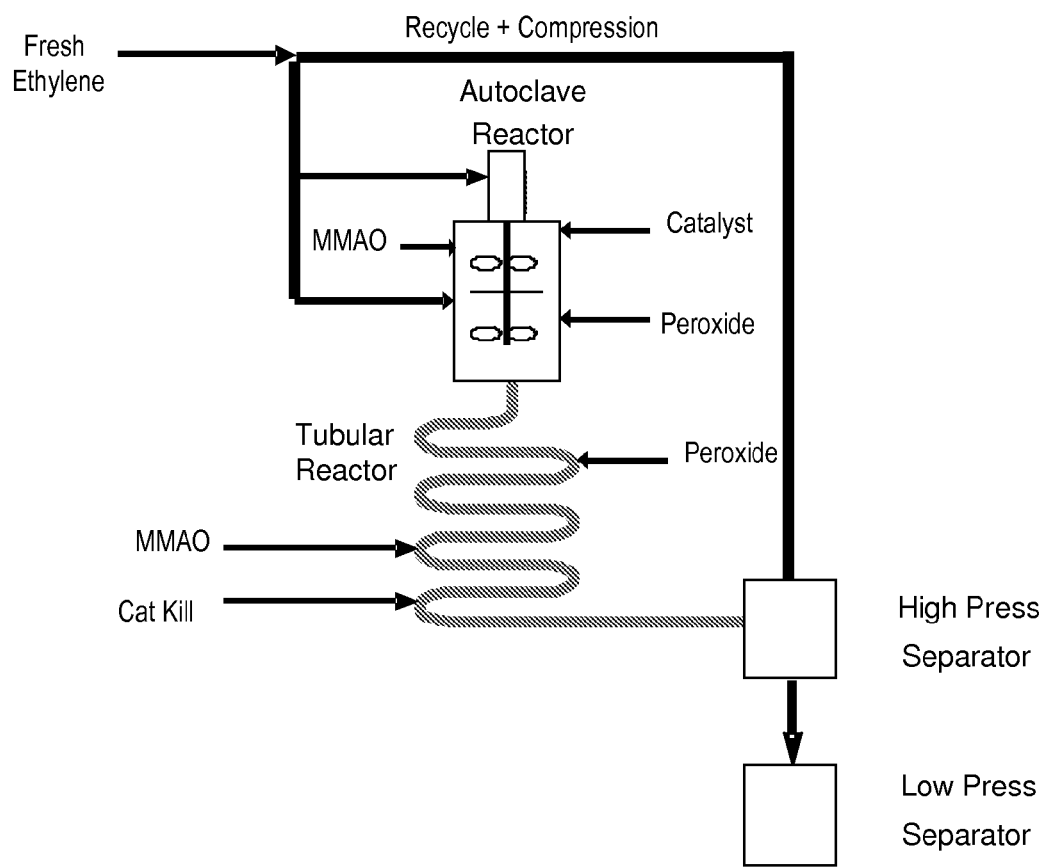

Examples of some reactor configurations of the inventive process are shown in FIGS. 1 and 2. The inventive process can be operated in either one or more tube reactors, autoclave reactors, or autoclave/tube configurations. In one embodiment, the split between the first ethylene-based polymer and the second ethylene-based polymer is controlled in the tube process by using different lengths of the tube for each reaction zone. In another embodiment, in an autoclave/tube or autoclave process, the split is controlled by dividing the autoclave into separate zones with baffles. Each zone can be used to produce either the first ethylene-based polymer or the second ethylene-based polymer.

Ethylene used for the production of the ethylene-based polymers may be purified ethylene, which is obtained by removing polar components from a loop recycle stream and from fresh ethylene.

In one embodiment, the first ethylene-based polymer is a polyethylene homopolymer.

In another embodiment, the first ethylene-based polymer comprises ethylene and one or more comonomers, and preferably one comonomer. Comonomers include, but are not limited to, α-olefin comonomers, typically having no more than 20 carbon atoms. For example, the α-olefin comonomers may have 3 to 10 carbon atoms; or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene.

In one embodiment, the second ethylene-based polymer is a polyethylene homopolymer.

In another embodiment, the second ethylene-based polymer comprises ethylene and one or more comonomers, and preferably one comonomer. Comonomers that may be used in forming highly branched ethylene-based polymers include, but are not limited to, α-olefin comonomers, typically having no more than 20 carbon atoms. For example, the α-olefin comonomers, for example, may have 3 to 10 carbon atoms; or in the alternative, the α-olefin comonomers, for example, may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. In the alternative, exemplary comonomers include, but are not limited to α,β-unsaturated C3-C8-carboxylic acids, in particular maleic acid, fumaric acid, itaconic acid, acrylic acid, methacrylic acid and crotonic acid derivates of the α,β-unsaturated C3-C8-carboxylic acids, for example unsaturated C3-C15-carboxylic acid esters, in particular esters of C1-C6-alkanols, or anhydrides, in particular methyl methacrylate, ethyl methacrylate, n-butyl methacrylate, ter-butyl methacrylate, methyl acrylate, ethyl acrylate n-butyl acrylate, 2-ethylhexyl acrylate, tert-butyl acrylate, methacrylic anhydride, maleic anhydride, and itaconic anhydride. In another alternative, the exemplary comonomers include, but are not limited to, vinyl carboxylates, for example vinyl acetate. In another alternative, exemplary comonomers include, but are not limited to, n-butyl acrylate, acrylic acid and methacrylic acid. In a further embodiment, the comonomer(s) is/are added to the polymerization in an amount less than 5 mole %, or less than 2 mole %, based the total amount of ethylene added to the polymerization process.

Additives

An ethylene-based polymer composition may comprise at least one additive. Additives include, but are not limited to, stabilizers, plasticizers and fillers. Stabilizers include, for example, antioxidants, such as IRGANOX 1010 and IRGAFOS 168 (Ciba Specialty Chemicals; Glattbrugg, Switzerland). In general, polymers are treated with one or more stabilizers before an extrusion or other melt processes. In other embodiment processes, other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. The ethylene-based polymer composition may, for example, comprise less than 10 percent by the combined weight of one or more additives, based on the weight of the final composition.

Plasticizers include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as KAYDOL oil (Chemtura Corp.; Middlebury, Conn.) and SHELLFLEX 371 naphthenic oil (Shell Lubricants; Houston, Tex.). Another suitable oil is TUFFLO oil (Lyondell Lubricants; Houston, Tex.).

Fillers include, but are not limited to, organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays.

The ethylene-based polymer compositions may be blended or mixed with other polymers, such as other olefin-based polymers. Polymers include, for example, thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene, including high pressure, free-radical LDPE, Ziegler-Natta LLDPE, metallocene PE, including multiple reactor PE ("in reactor" blends of Ziegler-Natta PE and metallocene PE, such as products disclosed in U.S. Pat. No. 6,545,088 (Kolthammer, et al.); U.S. Pat. No. 6,538,070 (Cardwell, et al.); U.S. Pat. No. 6,566,446 (Parikh, et al.); U.S. Pat. No. 5,844,045 (Kolthammer, et al.); U.S. Pat. No. 5,869,575 (Kolthammer, et al.); and U.S. Pat. No. 6,448,341 (Kolthammer, et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers such as olefin plastomers and elastomers, ethylene and propylene-based copolymers (for example, polymers available under the trade designation VERSIFY™ Plastomers & Elastomers (The Dow Chemical Company), SURPASS (Nova Chemicals), and VISTAMAXX (ExxonMobil Chemical Co.)) can also be used.

Applications

The ethylene-based polymer compositions may be employed in a variety of conventional thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or non-woven fabrics.

DEFINITIONS

The term "composition," as used herein, includes a mixture of materials which comprise the composition, as well as reaction products and decomposition products formed from the materials of the composition.

The term "ethylene-based polymer composition," as used herein, refers to a composition that comprises at least one ethylene-based polymer, and typically comprises at least two ethylene-based polymers. These compositions may also include unreacted first ethylene-based polymer, as described herein, and/or a free radically polymerized ethylene-based polymer (for example, LDPE).

The second ethylene-based polymer, as described herein, is formed from at least the following: a) the first ethylene-based polymer, as described herein, and b) ethylene. In a preferred embodiment, the amount of ethylene is greater than 60 weight percent, preferably greater than 80 weight percent ethylene, based on the sum weight of the first ethylene-based polymer and ethylene.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term "hydrocarbon," as used herein, refers to a chemical compound that comprises only hydrogen and carbon atoms.

The term "molecular catalyst," as used herein, refers to a catalyst that can be defined by one molecular structure. This term does not include Ziegler-Natta catalysts, which can be defined by more than one molecular structure.

The term "boron-containing compound," as used herein, refers to a chemical compound that contains at least one boron atom.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Unless stated to the contrary, all test methods are current as of the filing date of U.S. Provisional Application No. 61/419,560.

Density

Density was measured according to ASTM D792, Method B. The polymer is heated to 374 F. and pressed at a pressure of 2000 lbs force (pneumatic press manufactured by Tetrahedron Associates Inc.). The sample is then cooled to 75 F., while maintaining under a 2000 lb force pressure, to form a "5 in.×5 in.×⅛ in." polymer plaque. Three coupons of the following dimensions "1.25 in.×1.25 in.×⅛ in." were cut using a Gotech Press. These coupons were used to measure the density based on Archimedes principle in a bath of isopropyl alcohol controlled at 23° C.

Melt Index

Melt index, or $I_2$, is measured in accordance with ASTM D 1238, Condition 190° C./2.16 kg, and is reported in grams eluted per 10 minutes. $I_{10}$ is measured in accordance with ASTM D 1238, Condition 190° C./10 kg, and is reported in grams eluted per 10 minutes.

Differential Scanning Calorimetry

Differential Scanning calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). A 3-10 mg, "6 mm diameter" specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C., and held isothermal for 3 minutes, in order to remove its thermal history. Next, the sample is cooled to −40° C., at a 10° C./minute cooling rate, and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), heat of fusion ($H_f$) (in Joules per gram), and the calculated % crystallinity for polyethylene samples using Equation 1:

$$\% \text{ Crystallinity} = ((H_f)/(292 \text{ J/g})) \times 100 \quad \text{(Eq. 1)}.$$

The heat of fusion ($H_f$) and the peak melting temperature are reported from the second heat curve. Peak crystallization temperature is determined from the cooling curve.

Gel Permeation Chromatography (GPC)

The GPC system consists of a Waters (Milford, Mass.) 150° C. high temperature chromatograph (other suitable high temperatures GPC instruments include Polymer Laboratories (Shropshire, UK) Model 210 and Model 220), equipped with an on-board differential refractometer (RI). Additional detectors can include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC," while the term "GPC" alone generally refers to conventional GPC. Depending on the sample, either the 15-degree angle or the 90-degree angle of the light scattering detector is used for calculation purposes.

Data collection is performed using Viscotek TriSEC software, Version 3, and a 4-channel Viscotek Data Manager DM400. The system is also equipped with an on-line solvent degassing device from Polymer Laboratories (Shropshire, UK). Suitable high temperature GPC columns can be used such as four "30 cm long" Shodex HT803 13 micron columns or four "30 cm" Polymer Labs columns of 20-micron mixed-pore-size packing (MixA LS, Polymer Labs). The sample carousel compartment is operated at 140° C. and the column compartment is operated at 150° C. The samples are prepared at a concentration of "0.1 grams of polymer" in 50 milliliters of solvent. The chromatographic solvent and the sample preparation solvent contain 200 ppm of butylated hydroxytoluene (BHT). Both solvents are sparged with nitrogen. The polyethylene samples are gently stirred at 160° C. for four hours. The injection volume is 200 microliters. The flow rate through the GPC is set at 1 ml/minute.

The GPC column set is calibrated before running the Examples by running twenty-one narrow molecular weight distribution polystyrene standards. The molecular weight (MW) of the standards ranges from 580 to 8,400,000 grams per mole, and the standards are contained in 6 "cocktail" mixtures. Each standard mixture has at least a decade of separation between individual molecular weights. The standard mixtures are purchased from Polymer Laboratories (Shropshire, UK). The polystyrene standards are prepared at "0.025 g" in 50 mL of solvent for molecular weights equal to, or greater than, 1,000,000 grams per mole, and "0.05 g" in 50 ml of solvent for molecular weights less than 1,000,000 grams per mole. The polystyrene standards were dissolved at 80° C. with gentle agitation for 30 minutes. The narrow standards mixtures are run first, and in order of decreasing highest molecular weight component to minimize degradation. The polystyrene standard peak molecular weights are converted to polyethylene $M_w$ using the Mark-Houwink K and a (sometimes referred to as α) values mentioned later for polystyrene and polyethylene. See the Examples section for a demonstration of this procedure.

With 3D-GPC absolute weight average molecular weight ("$M_{w, Abs}$") and intrinsic viscosity are also obtained independently from suitable narrow polyethylene standards using the same conditions mentioned previously. These narrow linear polyethylene standards may be obtained from Polymer Laboratories (Shropshire, UK; Part No.'s PL2650-0101 and PL2650-0102).

The systematic approach for the determination of multi-detector offsets is performed in a manner consistent with that published by Balke, Mourey, et al. (Mourey and Balke, *Chromatography Polym.*, Chapter 12, (1992)) (Balke, Thitiratsakul, Lew, Cheung, Mourey, *Chromatography Polym.*, Chapter 13, (1992)), optimizing triple detector log($M_w$ and intrinsic viscosity) results from Dow 1683 broad polystyrene (American Polymer Standards Corp.; Mentor, Ohio) or its equivalent to the narrow standard column calibration results from the narrow polystyrene standards calibration curve. The molecular weight data, accounting for detector volume offset determination, are obtained in a manner consistent with that published by Zimm (Zimm, B. H., *J. Chem. Phys.*, 16, 1099 (1948)) and Kratochvil (Kratochvil, P., *Classical Light Scattering from Polymer Solutions*, Elsevier, Oxford, N.Y. (1987)). The overall injected concentration used in the determination of the molecular weight is obtained from the mass detector area and the mass detector constant derived from a suitable linear polyethylene homopolymer, or one of the polyethylene standards. The calculated molecular weights are obtained using a light scattering constant, derived from one or more of the polyethylene standards mentioned, and a refractive index concentration coefficient, dn/dc, of 0.104. Generally, the mass detector response and the light scattering constant should be determined from a linear standard with a molecular weight in excess of about 50,000 Daltons. The viscometer calibration can be accomplished using the methods described by the manufacturer, or, alternatively, by using the published values of suitable linear standards, such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

g' by 3D-GPC

The index (g') for the sample polymer is determined by first calibrating the light scattering, viscosity, and concentration detectors, described in the Gel Permeation Chromatography method supra, with SRM 1475a homopolymer polyethylene (or an equivalent reference). The light scattering and viscometer detector offsets are determined relative to the concentration detector, as described in the calibration. Baselines are subtracted from the light scattering, viscometer, and concentration chromatograms and integration windows are then set, making certain to integrate all of the low molecular weight retention volume range in the light scattering and viscometer chromatograms that indicate the presence of detectable polymer from the refractive index chromatogram. A linear homopolymer polyethylene is used to establish a Mark-Houwink (MH) linear reference line by injecting a broad molecular weight polyethylene reference, such as SRM1475a standard, calculating the data file, and recording the intrinsic viscosity (IV) and molecular weight ($M_W$), each derived from the light scattering and viscosity detectors, respectively, and the concentration, as determined from the RI detector mass constant for each chromatographic slice. For the analysis of samples, the procedure for each chromatographic slice is repeated to obtain a sample Mark-Houwink line. Note that for some samples the lower molecular weights, the intrinsic viscosity and the molecular weight data may need to be extrapolated, such that the measured molecular weight and intrinsic viscosity asymptotically approach a linear homopolymer GPC calibration curve. To this end, many highly-branched ethylene-based polymer samples require that the linear reference line be shifted slightly to account for the contribution of short chain branching, before proceeding with the long chain branching index (g') calculation.

A g-prime ($g_i'$) is calculated for each branched sample chromatographic slice (i) and measuring molecular weight ($M_i$) according to Equation 2:

$$g_i' = (IV_{Sample,i}/IV_{linear\ reference,j}) \quad \text{(Eq. 2)},$$

where the calculation utilizes the $IV_{linear\ referenced,j}$ at equivalent molecular weight, $M_j$, in the linear reference sample. In other words, the sample IV slice (i) and reference IV slice (j) have the same molecular weight ($M_i = M_j$). For simplicity, the $IV_{linear\ referenced,j}$ slices are calculated from a fifth-order polynomial fit of the reference Mark-Houwink Plot. The IV ratio, or $g_i'$, is only obtained at molecular weights greater than 3,500 because of signal-to-noise limitations in the light scattering data. The number of branches along the sample polymer ($B_n$) at each data slice (i) can be determined by using Equation 3, assuming a viscosity shielding epsilon factor of 0.75:

$$\left[\frac{IV_{Sample,i}}{IV_{linear\_reference,j}}\right]_{M_i=j}^{1.33} = \left[\left(1 + \frac{B_{n,i}}{7}\right)^{1/2} + \frac{4}{9}\frac{B_{n,i}}{\pi}\right]^{-1/2}. \quad \text{(Eq. 3)}$$

Finally, the average LCBf quantity per 1000 carbons in the polymer across all of the slices (i) can be determined using Equation 4:

$$LCBf = \frac{\sum_{M=3500}^{i}\left(\frac{B_{n,i}}{M_i/14000}c_i\right)}{\sum c_i}. \quad \text{(Eq. 4)}$$

gpcBR Branching Index by 3D-GPC

In the 3D-GPC configuration the polyethylene and polystyrene standards can be used to measure the Mark-Houwink constants, K and α, independently for each of the two polymer types, polystyrene and polyethylene. These can be used to refine the Williams and Ward polyethylene equivalent molecular weights in application of the following methods.

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the refractive index chromatogram. Linear polyethylene standards are then used to establish polyethylene and polystyrene Mark-Houwink constants as described previously. Upon obtaining the constants, the two values are used to construct two linear reference conventional calibrations ("cc") for polyethylene molecular weight and polyethylene intrinsic viscosity as a function of elution volume, as shown in Equations 5 and 6:

$$M_{PE} = \left(\frac{K_{PS}}{K_{PE}}\right)^{1/\alpha_{PE}+1} \cdot M_{PS}^{\alpha_{PS}+1/\alpha_{PE}+1}, \text{ and} \quad \text{(Eq. 5)}$$

$$[\eta]_{PE} = K_{PS} \cdot M_{PS}^{\alpha+1}/M_{PE}. \quad \text{(Eq. 6)}$$

The gpcBR branching index is a robust method for the characterization of long chain branching. See Yau, Wallace W., "Examples of Using 3D-GPC—TREF for Polyolefin Characterization", *Macromol. Symp.*, 2007, 257, 29-45. The index avoids the slice-by-slice 3D-GPC calculations traditionally used in the determination of g' values and branching frequency calculations in favor of whole polymer detector areas and area dot products. From 3D-GPC data, one can obtain the sample bulk $M_W$ by the light scattering (LS) detector using the peak area method. The method avoids the slice-by-slice ratio of light scattering detector signal over the concentration detector signal as required in the g' determination.

$$M_W = \sum_i w_i M_i = \quad \text{(Eq. 7)}$$

$$\sum_i \left(\frac{C_i}{\sum_i C_i}\right) M_i = \frac{\sum_i C_i M_i}{\sum_i C_i} = \frac{\sum_i LS_i}{\sum_i C_i} = \frac{LS\ \text{Area}}{Conc.\ \text{Area}}.$$

The area calculation in Equation 7 offers more precision because as an overall sample area it is much less sensitive to variation caused by detector noise and GPC settings on baseline and integration limits. More importantly, the peak area calculation is not affected by the detector volume offsets.

Similarly, the high-precision sample intrinsic viscosity (IV) is obtained by the area method shown in Equation 8:

$$IV = [\eta] = \sum_i w_i IV_i = \qquad (Eq.\ 8)$$

$$\sum_i \left(\frac{C_i}{\sum_i C_i}\right) IV_i = \frac{\sum_i C_i IV_i}{\sum_i C_i} = \frac{\sum_i DP_i}{\sum_i C_i} = \frac{DP\ \text{Area}}{Conc.\ \text{Area}},$$

where $DP_i$ stands for the differential pressure signal monitored directly from the online viscometer.

To determine the gpcBR branching index, the light scattering elution area for the sample polymer is used to determine the molecular weight of the sample. The viscosity detector elution area for the sample polymer is used to determine the intrinsic viscosity (IV or $[\eta]$) of the sample.

Initially, the molecular weight and intrinsic viscosity for a linear polyethylene standard sample, such as SRM1475a or an equivalent, are determined using the conventional calibrations for both molecular weight and intrinsic viscosity as a function of elution volume, per Equations 9 and 10:

$$Mw_{CC} = \sum_i \left(\frac{C_i}{\sum_i C_i}\right) M_i = \sum_i w_i M_i,\ \text{and} \qquad (Eq.\ 9)$$

$$[\eta]_{CC} = \sum_i \left(\frac{C_i}{\sum_i C_i}\right) IV_i = \sum_i w_i IV_i. \qquad (Eq.\ 10)$$

Equation 11 is used to determine the gpcBR branching index:

$$gpcBR = \left[\left(\frac{[\eta]_{CC}}{[\eta]}\right) \cdot \left(\frac{M_w}{M_{w,CC}}\right)^{\alpha_{PE}} - 1\right], \qquad (Eq.\ 11)$$

where $[\eta]$ is the measured intrinsic viscosity, $[\eta]_{cc}$ is the intrinsic viscosity from the conventional calibration, $M_w$ is the measured weight average molecular weight, and $M_{w,cc}$ is the weight average molecular weight of the conventional calibration. The Mw by light scattering (LS) using Equation (7) is commonly referred to as the absolute Mw, while the Mw,cc from Equation (9) using the conventional GPC molecular weight calibration curve is often referred to as polymer chain Mw. All statistical values with the "cc" subscript are determined using their respective elution volumes, the corresponding conventional calibration as previously described, and the concentration ($C_i$) derived from the mass detector response. The non-subscripted values are measured values based on the mass detector, LALLS, and viscometer areas. The value of $K_{PE}$ is adjusted iteratively until the linear reference sample has a gpcBR measured value of zero. For example, the final values for α and Log K for the determination of gpcBR in this particular case are 0.725 and −3.355, respectively, for polyethylene, and 0.722 and −3.993 for polystyrene, respectively.

Once the K and α values have been determined, the procedure is repeated using the branched samples. The branched samples are analyzed using the final Mark-Houwink constants as the best "cc" calibration values and applying Equations 7-11.

The interpretation of gpcBR is straight forward. For linear polymers, gpcBR calculated from Equation 11 will be close to zero since the values measured by LS and viscometry will be close to the conventional calibration standard. For branched polymers, gpcBR will be higher than zero, especially with high levels of LCB, because the measured polymer $M_w$ will be higher than the calculated $M_{w,cc}$, and the calculated $IV_{cc}$ will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular Examples, the advantage of using gpcBR in comparison to the g' index and branching frequency calculations is due to the higher precision of gpcBR. All of the parameters used in the gpcBR index determination are obtained with good precision, and are not detrimentally affected by the low 3D-GPC detector response at high molecular weight from the concentration detector. Errors in detector volume alignment also do not affect the precision of the gpcBR index determination. In other particular cases, other methods for determining $M_w$ moments may be preferable to the aforementioned technique.

CEF Method

Polymer branching distribution analysis is performed by Crystallization Elution Fractionation (CEF) (PolymerChar in Spain) (B. Monrabal et al, Macromol. Symp. 257, 71-79 (2007)). The CEF instrument is equipped with three detectors: an IR4 infra-red detector to measure polymer concentration, and a two-capillary viscometer both from Polymer ChAR (Valencia, Spain), and the Precision Detectors (Amherst, Mass.) 2-angle laser light scattering detector Model 2040. Ortho-dichlorobenzene (ODCB) with 600 ppm antioxidant butylated hydroxytoluene (BHT) is used as the solvent. Sample preparation is done with an autosampler at 160° C., for 2 hours, under shaking at 4 mg/ml (unless otherwise specified). The injection volume is 300 μl. The top oven temperature, where the detectors and injection loop are located at, is at 150° C. The temperature profile of CEF is: crystallization at 3° C./min from 110° C. to 30° C., thermal equilibrium at 30° C. for 5 minutes, and elution at 3° C./min from 30° C. to 140° C. The flow rate during crystallization is at 0.052 ml/min. The flow rate during elution is at 0.50 ml/min. The data is collected at one data point/second.

The CEF column is packed by the Dow Chemical Company with glass beads at 125 micron ±6% (MO-SCI Specialty Products) with ⅛ inch stainless tubing. The glass beads are acid washed by MO-SCI Specialty. The column volume is 2.06 ml. The column temperature calibration is performed by using a mixture of NIST Standard Reference Material Linear polyethylene 1475a (1.0 mg/ml) and Eicosane ($C_{20}H_{42}$) (2 mg/ml) in ODCB. The temperature is calibrated by adjusting the elution heating rate, so that the NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, ≥97.0%) (1 mg/ml). A baseline separation of hexacontane and NIST polyethylene 1475a is achieved. The area of hexacontane ($C_{60}H_{122}$) (from 35.0 to 67.0° C.) to the area of NIST 1475a, from 67.0 to 110.0° C., is 50 to 50, and the amount of soluble fraction below 35.0° C. is <1.8 wt %.

The CEF column resolution is defined by the following equation:

$$\text{Resolution} = \frac{\text{Peak temperature of } NIST\ 1475a - \text{Peak Temperature of Hexacontane}}{\text{Half-height Width of } NIST\ 1475a + \text{Half-height Width of Hexacontane}}$$

The column resolution is 6.0.

The trefBR value is a long chain branching parameter determined from CEF data as described in Yau, Wallace W., "Examples of Using 3D-GPC-TREF for Polyolefin Characterization", Macromol. Symp. 2007, 257, 29-45. The trefBR is calculated as:

$$trefBR \equiv \left[\frac{K * Mw_{LS}^\alpha}{[\eta]_{TrefV}}\right] - 1$$

where: $\alpha \approx 0.725$, $\text{Log}K = -3.355$ for polyethylene

The following examples illustrate, but do not, either explicitly or by implication, limit the present invention.

EXPERIMENTAL

Representative Polymerization—Two Separate Reaction Zones

Figure 3:
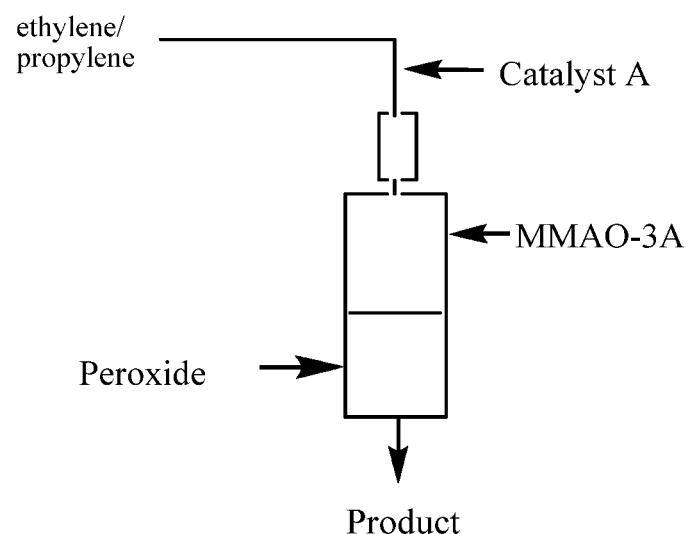

A high pressure "300 ml" continuous autoclave reactor was separated into two equal zones with a baffle (see FIG. 3), pressured with ethylene to 28,000 psi, at an ethylene flow rate of 15 lb/hr. Propylene was added into the ethylene stream at 3 mol %, based on the total amount of ethylene added to the polymerization process. The resulting mixture was heated to 195° C. To the reactor, MMAO cocatalyst and the catalyst (CAT A) were added to the first zone, to produce concentrations in the reactor equal to 8.2 mol ppm Al and 0.016 mol ppm Zr; each "ppm" was based on the total amount of ethylene added to the polymerization process. The catalyst (CAT A) was zirconium, dimethyl[(2,2'-[1,3 propanediylbis(oxy-kO)]bis[3'',5,5''-tris(1,1-dimethylethyl)-5'-methyl[1,1':3',1'' terphenyl]-2'-olato-kO]](2-)]-, (OC-6-33)-) (see International Publication No. WO 2007/136494 (Cat. A11), fully incorporated herein by reference).

The first ethylene-based polymer from the first reactor zone was transferred to the second reactor zone, along with ethylene. Peroxide was added to the second reactor zone to produce a concentration in the second zone of 2.1 mol ppm, based on the total amount of ethylene added to the polymerization process.

The ethylene-based polymer composition was produced at 0.78 lb/hr (density=0.9296 g/cc, melt index (MI or I2)=1.12 dg/min) See Table 1 (Example 2).

Representative Polymerization—One Reaction Zone

Figure 4:
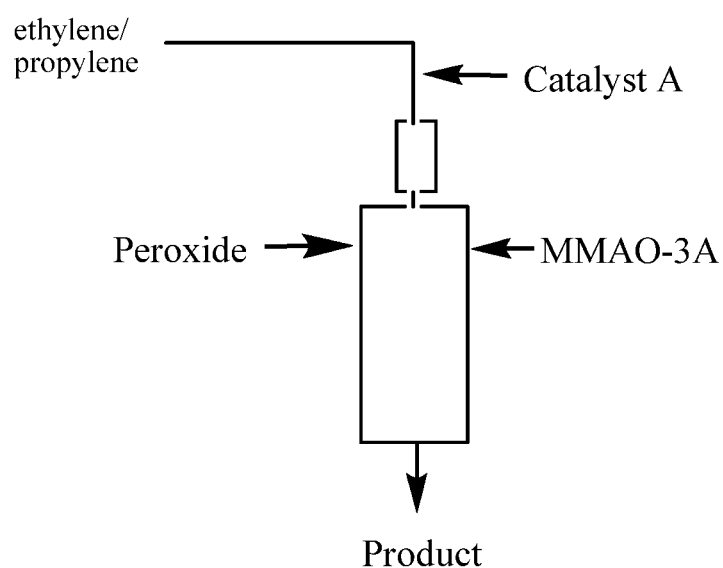

A high pressure "300 ml" continuous autoclave reactor (see FIG. 4) was pressured with ethylene to 28,000 psi, at an ethylene flow rate of 12 lb/hr. Propylene was added at 1 mol %, based on the total amount of ethylene added to the polymerization process, into the ethylene stream. This mixture was heated to 220° C. Peroxide (PO) was added to produce a concentration in the reactor of 1.5 mol ppm, based on the total amount of ethylene added to the polymerization process. To the reactor, MMAO cocatalyst and CAT A were added to produce concentrations in the reactor equal to 16.8 mol ppm Al and 0.071 mol ppm Zr; each "ppm" was based on the total amount of ethylene added to the polymerization process. A polyethylene composition was produced at 0.72 lb/hr of polyethylene (density=0.9275 g/cc, melt index (MI or I2)=1.92 dg/min) See Table 2 (Example 7).

TABLE 2

| Sample | C2 flow (mol/hr) | CAT A (mol ppm) | MMAO (mol ppm) | PO (mol ppm) | H2 (mol/hr) | C3 (mol/hr) | reactor Temp (C.) | MI (dg/min) | density (g/cc) | Conversion (%)* |
|---|---|---|---|---|---|---|---|---|---|---|
| 7** | 194 | 0.071 | 16.8 | 1.5 | 0 | 2.16 | 218 | 1.92 | 0.9275 | 6.02 |
| 8** | 194 | 0.054 | 12.6 | 1.5 | 0 | 1.96 | 227 | 0.81 | 0.9244 | 8.09 |
| 9** | 194 | 0.051 | 12.2 | 1.25 | 0 | 2.11 | 232 | 0.76 | 0.9264 | 7.72 |
| 10** | 194 | 0.051 | 12.2 | 1 | 0 | 2.52 | 227 | 0.29 | 0.9287 | 6.29 |
| 11** | 194 | 0.04 | 12.2 | 0.4 | 0 | 1.91 | 254 | 12.83 | 0.9279 | 6.46 |
| 12** | 194 | 0.064 | 20.7 | 0.6 | 0 | 1.16 | 260 | 563 | 0.9242 | 8.26 |

*% Conversion = [(lbs ethylene-based polymer composition produced per hour)/(lbs of ethylene fed per hour)] × 100.
**MI and density measured on composition containing ppm amounts of stabilizers (1330 ppm IRGANOX 1010 and 670 ppm IRGANOX 168).

DSC of Examples

Figure 5:
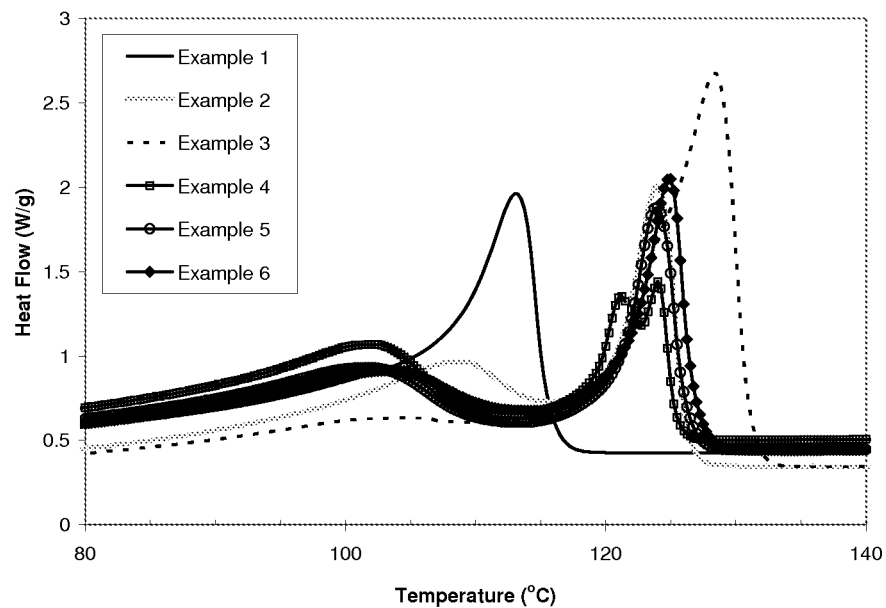
FIG. 5 depicts "DSC heat flow vs. temperature" of Examples 1-6.
Figure 6:
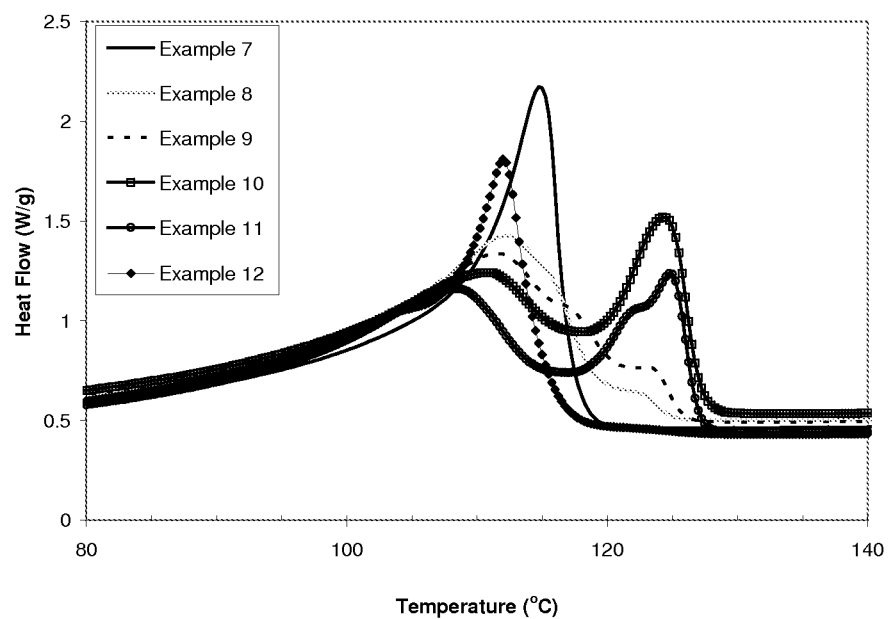
FIG. 6 depicts "DSC heat flow vs. temperature" of Examples 7-12.
Figure 7:
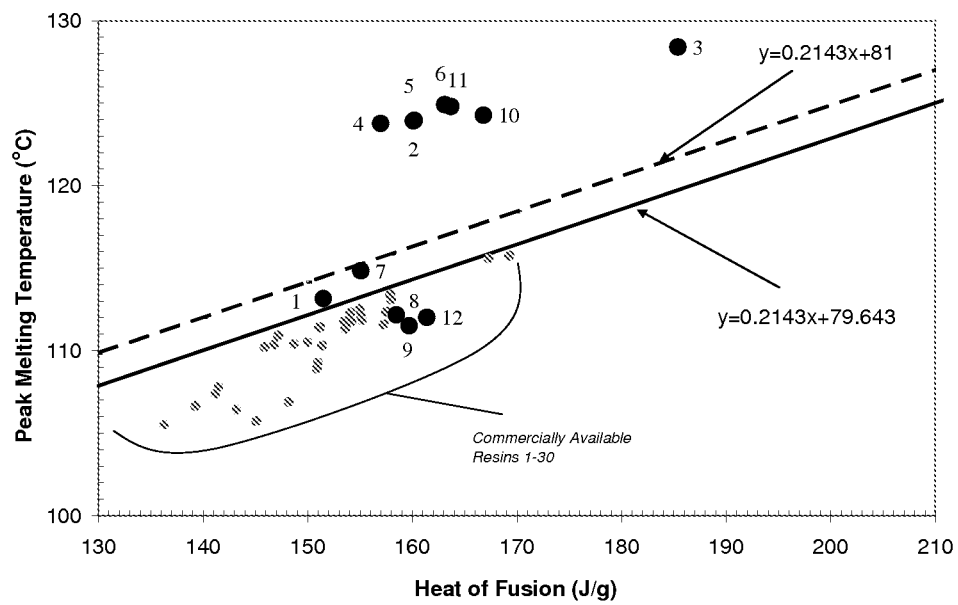
FIG. 7 depicts "Highest peak melting temperature vs. heat of fusion" from DSC of Examples 1-12, and commercially available LDPE resins 1-30 and claim lines from WO 2009/114661.

The DSC results for the Examples of Table 1 and 2 are shown in Table 3 and in FIGS. 5 and 6. FIG. 7 shows a plot of the "highest peak melting temperature versus the heat of fusion" for Examples 1-12, in which the Example numbers are shown in the figure, as compared to results from WO 2009/114661. Examples 8-9 and Example 12 are lower density (0.9242-0.9264 g/cc) and were produced in one reaction zone.

TABLE 3

Melting Temperatures (Tm), Heat of Fusion, % Crystallinity, and Crystallization Temperatures (Tc) from DSC of Examples 1-12.

| Example | Tm (° C.) | Tm2 (° C.) | Tm3 (° C.) | Heat of Fusion (J/g) | % Cryst. | Tc (° C.) | Tc2 (° C.) | Tc3 (° C.) |
|---|---|---|---|---|---|---|---|---|
| 1 | 113.1 | | | 151.5 | 51.9 | 101.0 | 63.8 | |
| 2 | 123.9 | 109.0 | | 160.2 | 54.9 | 111.9 | 102.5 | 66.4 |
| 3 | 128.4 | 104.8 | | 185.4 | 63.5 | 116.7 | NM | |
| 4 | 123.8 | 121.2 | 102.2 | 157.0 | 53.8 | 109.7 | 95.5 | 60.7 |
| 5 | 123.9 | 102.0 | | 160.1 | 54.8 | 111.7 | 95.0 | |

TABLE 1

| Example | C2 flow (mol/hr) | CAT A (mol ppm) | MMAO (mol ppm) | PO (mol ppm) | H2 (mol/hr) | C3 (mol/hr) | zone 1 Temp (C.) | zone 2 Temp (C.) | MI (dg/min) | Density (g/cc) | Conversion (%)* |
|---|---|---|---|---|---|---|---|---|---|---|---|
| 1 | 242 | 0.027 | 8.35 | 6.8 | 0.411 | 3.78 | 210 | 228 | 1.05 | 0.9215 | 11.4 |
| 2 | 242 | 0.016 | 8.2 | 2.1 | 0.7 | 7.01 | 196 | 199 | 1.12 | 0.9296 | 5.2 |
| 3 | 242 | 0.031 | 8.24 | 3 | 0.3 | 7.3 | 227 | 220 | 0.19 | 0.9379 | 10.2 |
| 4** | 194 | 0.047 | 13.8 | 2.8 | 0 | 6.4 | 208 | 230 | 8.08 | 0.9226 | 7.9 |
| 5** | 194 | 0.049 | 14 | 2.8 | 0 | 5.82 | 210 | 240 | 4.48 | 0.9245 | 8.54 |
| 6** | 194 | 0.055 | 13.6 | 2.72 | 0 | 5.35 | 216 | 240 | 0.64 | 0.9279 | 9.26 |

*% Conversion = [(lbs ethylene-based polymer composition produced per hour)/(lbs of ethylene fed per hour)] × 100.
**MI and density measured on composition containing ppm amounts of stabilizers (1330 ppm IRGANOX 1010 and 670 ppm IRGANOX 168).

TABLE 3-continued

Melting Temperatures (Tm), Heat of Fusion, % Crystallinity, and Crystallization Temperatures (Tc) from DSC of Examples 1-12.

| Example | Tm (° C.) | Tm2 (° C.) | Tm3 (° C.) | Heat of Fusion (J/g) | % Cryst. | Tc (° C.) | Tc2 (° C.) | Tc3 (° C.) |
|---|---|---|---|---|---|---|---|---|
| 6 | 124.9 | 103.8 | | 163.1 | 55.9 | 113.2 | 97.2 | |
| 7 | 114.8 | | | 155.1 | 53.1 | 102.5 | 65.8 | |
| 8 | 112.2 | | | 158.5 | 54.3 | 103.2 | 64.4 | |
| 9 | 111.5 | | | 159.7 | 54.7 | 104.3 | 64.6 | |
| 10 | 124.3 | 110.8 | | 166.8 | 57.1 | 110.4 | 65.5 | |
| 11 | 124.8 | 108.5 | | 163.7 | 56.1 | 111.5 | 102.5 | 64.0 |
| 12 | 112.0 | | | 161.4 | 55.3 | 103.3 | 62.2 | |

TABLE 4

Triple Detector Gel Permeation Chromatography (TDGPC) results of Examples 1-12.

| Example | Mn (g/mol) | Mw (g/mol) | Mw/Mn | gpcBR | Mw (abs)/Mw (gpc) |
|---|---|---|---|---|---|
| 1 | 14,680 | 108,630 | 7.40 | 4.055 | 4.51 |
| 2 | 15,720 | 61,050 | 3.88 | 0.447 | 1.43 |
| 3 | 17,020 | 80,170 | 4.71 | 0.160 | 1.18 |
| 4 | 9,360 | 46,750 | 4.99 | 0.932 | 1.87 |
| 5 | 7,960 | 49,560 | 6.23 | 0.757 | 1.75 |
| 6 | 9,930 | 68,190 | 6.87 | 0.883 | 1.81 |
| 7 | 14,450 | 75,780 | 5.24 | 2.312 | 3.20 |
| 8 | 16,360 | 127,730 | 7.81 | 3.752 | 4.09 |
| 9 | 15,770 | 98,070 | 6.22 | 2.928 | 3.67 |
| 10 | 18,130 | 98,560 | 5.44 | 1.519 | 2.31 |
| 11 | 9,470 | 61,440 | 6.49 | 1.636 | 2.43 |
| 12 | 5,420 | 39,540 | 7.30 | 1.717 | 2.79 |

TDGPC (Triple Detector GPC or 3D-GPC) of Examples

Figure 8:
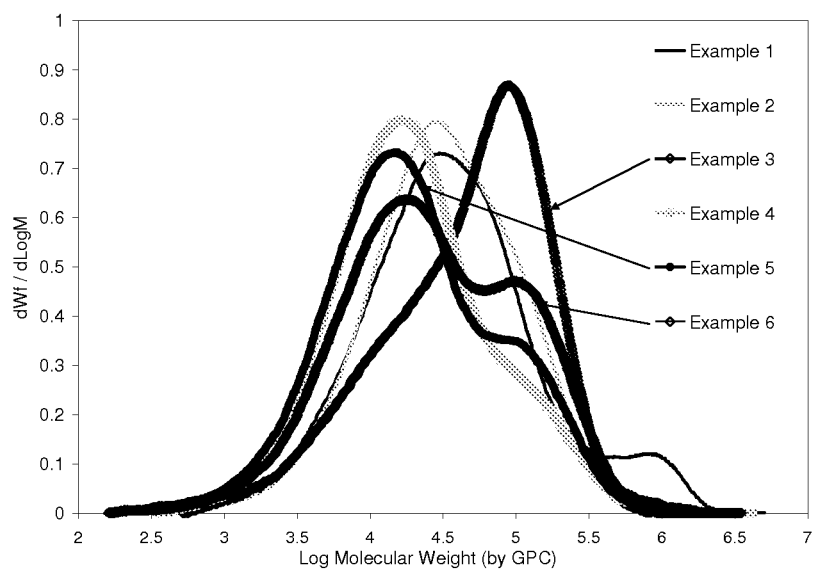
FIG. 8 depicts conventional GPC curve from TDGPC of Examples 1-6.
Figure 9:
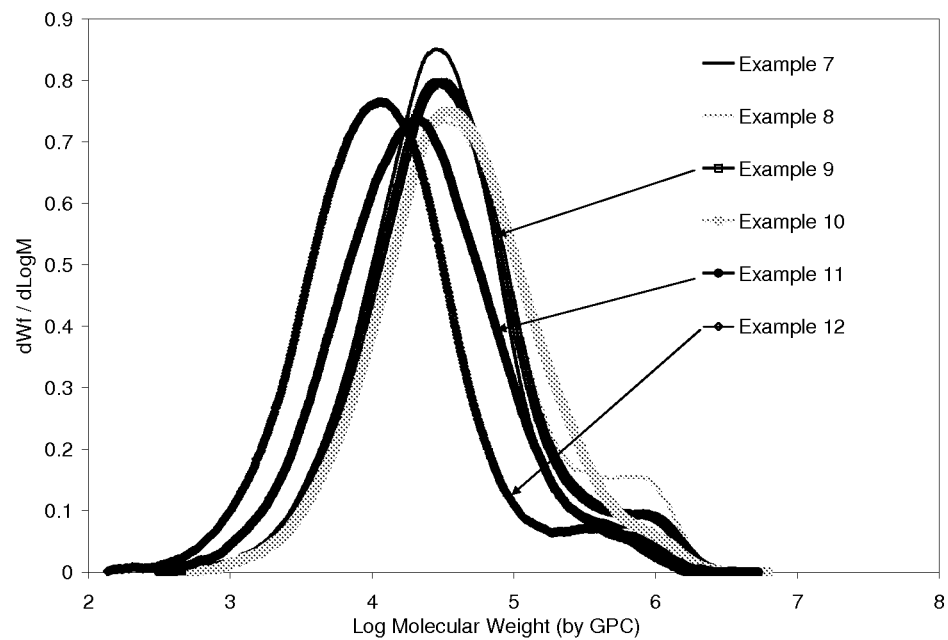
FIG. 9 depicts conventional GPC curve from TDGPC of Examples 7-12.
Figure 10:
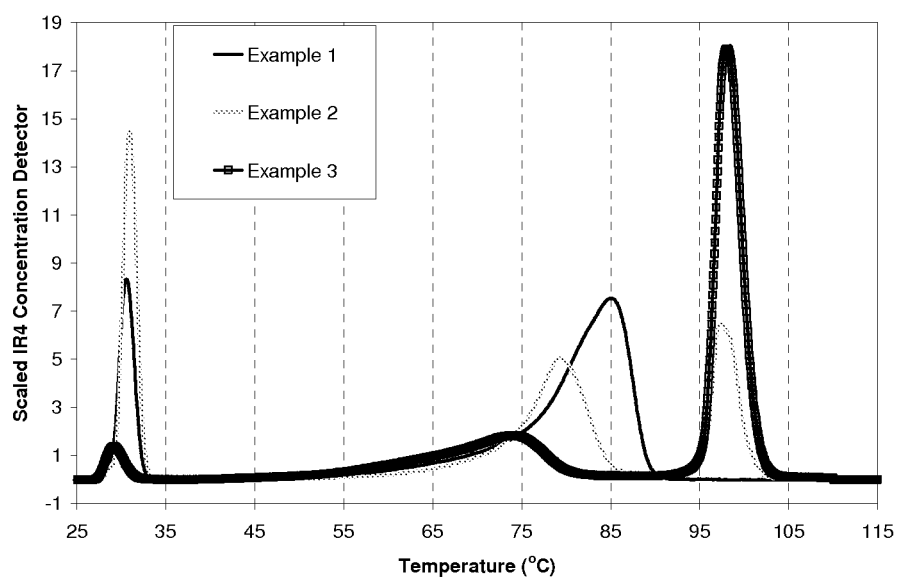
FIG. 10 depicts CEF scaled IR4 concentration detector vs. temperature of Examples 1-3.
Figure 11:
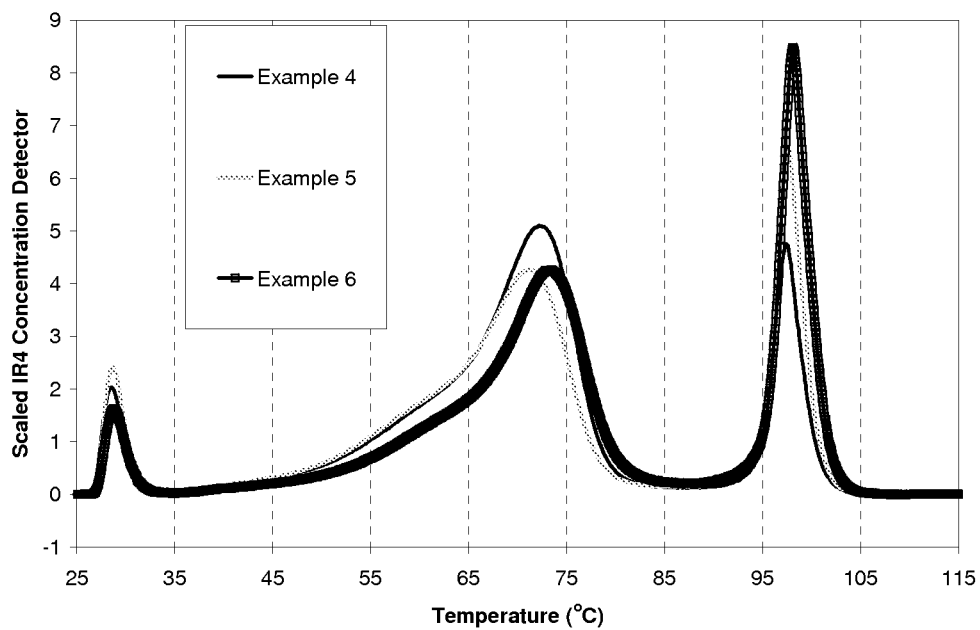
FIG. 11 depicts CEF scaled IR4 concentration detector vs. temperature of Examples 4-6.
Figure 12:
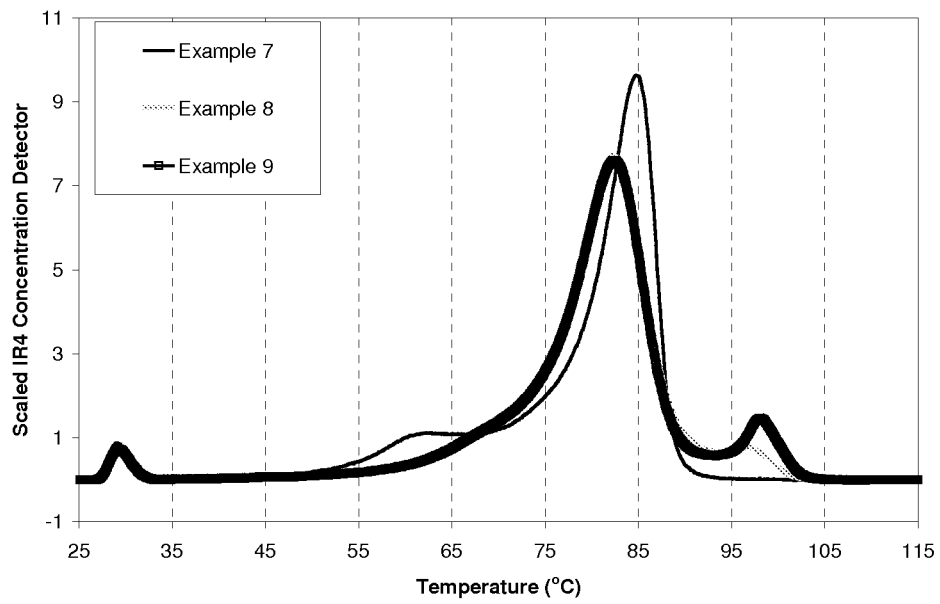
FIG. 12 depicts CEF scaled IR4 concentration detector vs. temperature of Examples 7-9.
Figure 13:
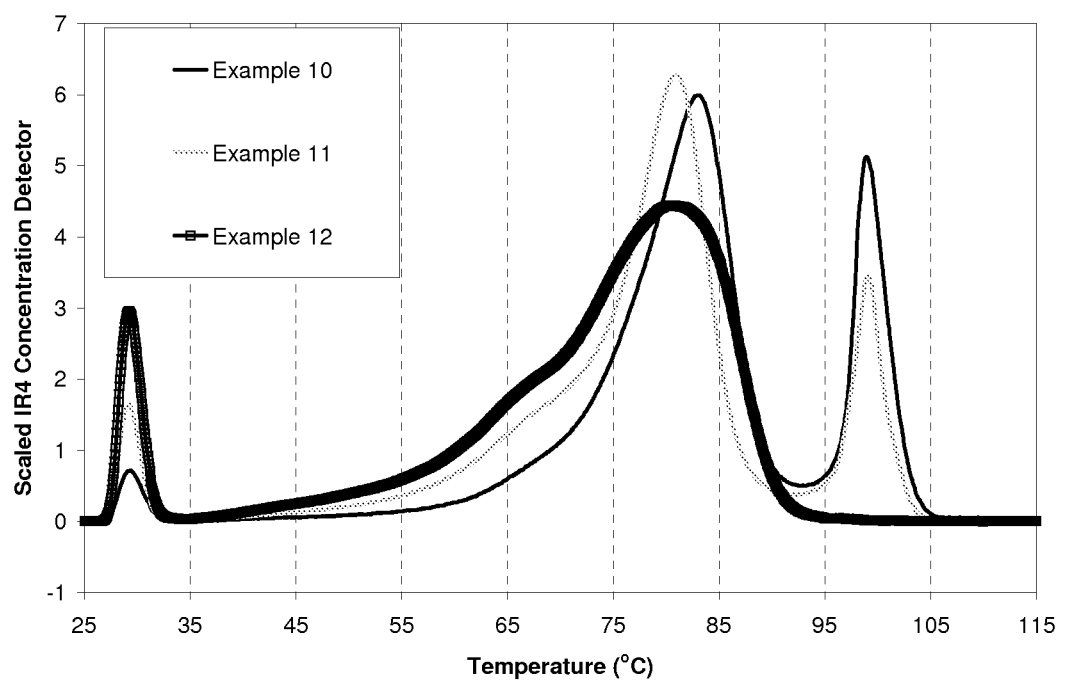
FIG. 13 depicts CEF scaled IR4 concentration detector vs. temperature of Examples 10-12.

Examples 1-12 were analyzed by the 3D-GPC technique as described above with results in Table 4 and FIGS. 8 and 9. The Examples show a wide range of properties with weight average molecular weights ranging from 39,540-127,730 g/mol, molecular weight distributions from Mw/Mn=3.88-7.81, gpcBR=0.160-4.06, in which gpcBR represents a relative measure of long chain branching, and Mw(abs)/Mw(gpc)=1.18-4.51, in which a linear material has a Mw(abs)/Mw(gpc)~1.

CEF of Examples

The CEF of the Examples are summarized in Tables 5-6 and FIGS. 10-14. The majority of the examples contain two fractions, with one being a high temperature fraction. For Examples 2-6 this high temperature fraction was greater than 86° C. and trefBR values of this fraction were shown in Table 5 for these Examples to be 0.73-2.74, indicating long chain branching on the high temperature fraction. For Examples 8-11, the trefBR was calculated at temperatures greater than 91° C. and the trefBR values were 1.93-4.24, indicating long chain branching on the high temperature fraction.

TABLE 5

CEF results of Examples 1-6.

| | Example | Example 1 | Example 2 | Example 3 | Example 4 | Example 5 | Example 6 |
|---|---|---|---|---|---|---|---|
| Whole Polymer | Mw(LS90) (g/mol) | 597,339 | 104,881 | 132,739 | 191,458 | 225,398 | 242,628 |
| | IV (g/ml) | 0.799 | 0.616 | 1.119 | 0.565 | 0.629 | 0.85 |
| Temperature Range (° C.) | Zone 1 | 26.01 to 34.96 | 26 to 34.96 | 26.69 to 31.95 | 25.72 to 31.96 | 25.72 to 31.95 | 25.72 to 31.98 |
| | Zone 2 | 35.01 to 59.97 | 35.01 to 59.94 | 32 to 86.02 | 32 to 85.99 | 32 to 85.99 | 32.03 to 86.25 |
| | Zone 3 | 60.01 to 79.98 | 60.01 to 88.97 | 86.1 to 109.99 | 86.09 to 109.98 | 86.09 to 109.97 | 86.37 to 109.95 |
| | Zone 4 | 80.04 to 99.98 | 89.01 to 99.99 | | | | |
| | Zone 5 | 100.02 to 107.96 | 100.05 to 107.99 | | | | |
| Peak Temperature (° C.) | Zone 1 | 30.6 | 31.0 | 29.1 | 28.5 | 28.7 | 28.7 |
| | Zone 2 | 59.9 | 59.9 | 73.9 | 72.2 | 71.3 | 73.4 |
| | Zone 3 | 80.0 | 79.4 | 98.1 | 97.4 | 97.5 | 98.1 |
| Weight Fraction | Zone 1 | 0.18 | 0.28 | 0.03 | 0.05 | 0.06 | 0.04 |
| | Zone 2 | 0.02 | 0.01 | 0.30 | 0.75 | 0.68 | 0.62 |
| | Zone 3 | 0.29 | 0.46 | 0.67 | 0.19 | 0.26 | 0.34 |
| | Zone 4 | 0.51 | 0.23 | | | | |
| | Zone 5 | | 0.02 | | | | |
| Mw (g/mol) | Zone 1 | 2,966 | 1,022 | | 3,470 | | 3,200 |
| | Zone 2 | | | 57,983 | 128,394 | 148,307 | 146,739 |
| | Zone 3 | 374,796 | 107,676 | 171,124 | 488,455 | 478,914 | 445,770 |
| | Zone 4 | 945,823 | 214,765 | | | | |
| Intrinsic Viscosity (IV) (g/dL) | Zone 1 | | | | | 0.10 | 0.01 |
| | Zone 2 | | | 0.33 | 0.35 | 0.34 | 0.41 |
| | Zone 3 | 0.64 | 0.57 | 1.59 | 1.57 | 1.51 | 1.76 |
| | Zone 4 | 1.12 | 1.43 | | | | |
| trefBR | Zone 1 | | | | | | 20.93 |
| | Zone 2 | | | 2.86 | 5.34 | 6.35 | 5.06 |
| | Zone 3 | 6.54 | 2.42 | 0.73 | 2.74 | 2.84 | 2.13 |
| | Zone 4 | 7.50 | 1.27 | | | | |

TABLE 6

CEF results of Examples 7-12.

|  |  | Example 7 | Example 8 | Example 9 | Example 10 | Example 11 | Example 12 |
|---|---|---|---|---|---|---|---|
| Whole Polymer | Mw(LS90) (g/mol) | 258,633 | 635,037 | 486,675 | 329,464 | 345,972 | 255,816 |
|  | IV (g/ml) | 0.817 | 0.758 | 0.849 | 0.92 | 0.589 | 0.446 |
| Temperature Range (° C.) | Zone 1 | 26.32 to 31.96 | 26.32 to 31.99 | 26.32 to 31.99 | 26.32 to 32 | 26.35 to 31.98 | 26.35 to 31.99 |
|  | Zone 2 | 32.01 to 93.56 | 32.02 to 94.3 | 32.04 to 93.19 | 32.05 to 93.02 | 32.02 to 91.7 | 32.04 to 95.48 |
|  | Zone 3 | 93.68 to 109.98 | 94.38 to 109.96 | 93.29 to 109.97 | 93.1 to 109.95 | 91.79 to 109.97 | 95.56 to 109.95 |
| Peak Temperature (° C.) | Zone 1 | 28.9 | 29.2 | 29.1 | 29.2 | 29.3 | 29.2 |
|  | Zone 2 | 85.2 | 82.8 | 82.8 | 83.2 | 80.9 | 80.4 |
|  | Zone 3 | 93.7 | 97.1 | 98.6 | 99.4 | 99.0 | 96.0 |
| Weight Fraction | Zone 1 | 0.02 | 0.02 | 0.02 | 0.02 | 0.04 | 0.07 |
|  | Zone 2 | 0.98 | 0.94 | 0.90 | 0.75 | 0.81 | 0.93 |
|  | Zone 3 | 0.00 | 0.04 | 0.08 | 0.23 | 0.15 | 0.00 |
| Mw (g/mol) | Zone 1 |  |  |  |  |  | 2,634 |
|  | Zone 2 | 251,296 | 638,495 | 476,825 | 315,827 | 316,122 | 267,513 |
|  | Zone 3 |  | 846,341 | 709,335 | 401,272 | 595,234 |  |
| Intrinsic Viscosity (IV) (g/dL) | Zone 1 |  |  |  |  |  |  |
|  | Zone 2 | 0.83 | 0.71 | 0.77 | 0.70 | 0.49 | 0.49 |
|  | Zone 3 |  | 1.88 | 1.89 | 1.74 | 1.29 |  |
| trefBR | Zone 1 |  |  |  |  |  |  |
|  | Zone 2 | 3.35 | 9.00 | 6.54 | 5.14 | 7.84 | 6.76 |
|  | Zone 3 |  | 3.65 | 3.08 | 1.93 | 4.24 |  |

The invention claimed is:

1. A process to form an ethylene-based polymer composition, the process comprising at least the following:
   Step 1: polymerizing a first ethylene-based polymer in the presence of at least one molecular catalyst and a hydrocarbon chain transfer agent, and at a polymerization pressure of at least 14,000 psi;
   Step 2: polymerizing a second ethylene-based polymer, and
   wherein the molecular catalyst is a zirconium complex of a polyvalent aryloxyether corresponding to the formula:

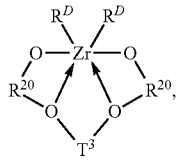

where $R^{20}$, independently in each occurrence, is a divalent aromatic or inertly substituted aromatic group, each having from 5 to 20 atoms not counting hydrogen;
   $T^3$ is a divalent hydrocarbon or a silane group, each having from 1 to 20 atoms not counting hydrogen, or an inertly substituted derivative thereof; and
   $R^D$, independently in each occurrence, is a monovalent ligand group having from 1 to 20 atoms, not counting hydrogen, or two $R^D$ groups together are a divalent ligand group having from 1 to 40 atoms, not counting hydrogen; and
   wherein at least one alkyl aluminum is added to the process after Step 2.

2. The process of claim 1, wherein the second ethylene-based polymer is polymerized in the presence of a free radical initiator.

3. The process of claim 1, wherein the first ethylene-based polymer and the second ethylene-based polymer are polymerized simultaneously.

4. The process of claim 1, wherein the first ethylene-based polymer is polymerized first, and wherein the second ethylene-based polymer is polymerized in the presence of the first ethylene-based polymer.

5. The process of claim 1, wherein the molecular catalyst is soluble in supercritical ethylene.

6. The process of claim 1, wherein the first ethylene-based polymer is polymerized in the presence of an alumoxane cocatalyst.

7. The process of claim 1, wherein the free radical initiator is a peroxide.

8. The process of claim 1, wherein the polymerization temperature in Step 1 is greater than, or equal to, 195° C.

9. The process of claim 1, wherein no hydrogen is added to Step 1 or Step 2.

10. The process of claim 1, wherein the process further comprises polymerizing a third ethylene-based polymer.

11. The process of claim 1, wherein at least one polyalkylene glycol is added to the process after Step 2.

12. A polymer composition formed by the process of claim 1.

13. The polymer composition of claim 12, wherein the polymer composition has a fraction in CEF, at a temperature of at least 85° C., of at least 5 weight percent (based on weight of polymer composition), and which has a trefBr value greater than 0.5.

14. A composition comprising the polymer composition of claim 12, and at least one additive.

15. An article comprising at least one component formed from the composition of claim 12.

* * * * *